(12) United States Patent
Jordan, Jr.

(10) Patent No.: US 7,726,066 B1
(45) Date of Patent: *Jun. 1, 2010

(54) PERIMETER PEST CONTROL SYSTEM

(76) Inventor: John Jeremiah Jordan, Jr., 2349 Walker Dr., Lawrenceville, GA (US) 30043

( * ) Notice: Subject to any disclaimer, the term of this patent is extended or adjusted under 35 U.S.C. 154(b) by 0 days.

This patent is subject to a terminal disclaimer.

(21) Appl. No.: 12/335,529

(22) Filed: Dec. 15, 2008

Related U.S. Application Data

(63) Continuation of application No. 11/460,539, filed on Jul. 27, 2006, now Pat. No. 7,464,499.

(51) Int. Cl.
*A01M 1/20* (2006.01)
(52) U.S. Cl. .......................... 43/124; 43/132.1
(58) Field of Classification Search .................. 43/124, 43/132.1
See application file for complete search history.

(56) References Cited

U.S. PATENT DOCUMENTS

| | | | | |
|---|---|---|---|---|
| 3,513,586 A | * | 5/1970 | James et al. .................. 43/124 |
| 5,819,466 A | * | 10/1998 | Aesch et al. .................. 43/123 |
| 5,860,266 A | * | 1/1999 | Martinet et al. ............. 52/741.3 |
| 6,088,950 A | * | 7/2000 | Jones ........................... 43/124 |
| 6,205,718 B1 | * | 3/2001 | Murphy et al. ................ 52/101 |
| 6,301,849 B1 | * | 10/2001 | Roth ......................... 52/302.6 |
| 6,755,400 B2 | * | 6/2004 | Howe ....................... 261/121.1 |
| 6,786,016 B1 | * | 9/2004 | Wood .......................... 52/290 |
| 7,464,499 B1 | * | 12/2008 | Jordan ......................... 43/124 |
| 2003/0196370 A1 | * | 10/2003 | Aesch, Jr. .................... 43/124 |

* cited by examiner

*Primary Examiner*—Kimberly S Smith
*Assistant Examiner*—Danielle Clerkley
(74) *Attorney, Agent, or Firm*—Sanford Jay Asman

(57) ABSTRACT

The elongated tubular pesticide administration system is designed to fit between the foundation wall of a structure and the lowest board in a lapped exterior wall system, such as wood, composites, cement-fiber board, vinyl, or aluminum siding. The pesticide dispersion system is attached to the inner surface of the lowest board, and it includes an extended, flexible, resilient seal which seals it against the outside of the foundation wall, thereby sealing the exposed area between formed between the foundation wall and the exterior siding. Pesticide foam is injected into the system through fill ports which are spaced along the bottom of the system. The pesticide foam fills the aperture and is then disbursed through pesticide dispersion holes.

17 Claims, 4 Drawing Sheets

PERIMETER PEST CONTROL SYSTEM

BACKGROUND OF THE INVENTION

The present invention relates to an article for sealing the lower portion of an exterior wall system which also acts as a pesticide application appliance. In particular, the present invention is intended to be used both to mechanically seal the exposed area created at the lower portion of the exterior walls of a structure, such as a residence, while simultaneously providing a means for facilitating the injection of chemical pesticides between the inner and outer portions of the exterior wall system, thereby providing a perimeter pest control system which extends around the periphery of the structure.

In the past there have been efforts to provide pesticide treatment to protect structures at the time that they are constructed. While it has been common practice in the construction of new buildings to pre-treat the fill or soil area which is to underlie the foundation with a termiticide, the initial termite barrier does not last indefinitely, so there is a need to supplement this barrier during the life of the building by providing an efficient and inexpensive means at the points where termites or other insects can gain access to wooden structural members. While termites do not bore holes through concrete, they can gain entry into the areas where wood is used in the construction of the building by forming earthen tunnels from ground level over the surfaces of concrete foundations, slabs, and walls. A common problem in buildings clad with exterior surfacing materials such as lap siding, which includes, but is not limited to wood, cement-fiber, composites, vinyl, and aluminum, is that even if the siding itself is made of a material which resists rotting, cracking, damage from rain or hail, or insect penetration, the exterior board siding is installed in lapped layers over the exterior portion of the internal wall structure, whereby an exposed area is formed behind the lowest board, e.g., between the rear (inner) surface of the lowest board and the outer surface of the foundation wall, which would permit insects to climb from the ground up and gain access to the structure via the exposed area. For example, even such popular construction materials as cement board siding, e.g., those sold by James Hardie Building Products, called "Hardie Board", while themselves impervious to insect penetration, permit insects to gain access in the exposed area formed behind the lowest board.

In particular, termites are able to build tunnels in the tiny spaces between the walls and the surfacing material, and their tunneling activity will not be detected because it is behind the cement board exterior surfacing material. Thus, while the exterior surfacing material will prevent termites or other insects from gaining access through them, the lack of a seal between the exterior portion of the internal structural wall and the interior portion of the exterior surfacing material provides a path through which termites can enter the structure from behind the exterior surfacing material.

This situation can be made worse if landscaping activities decrease the vertical space between the ground and the upper portion of the foundation wall following construction which make it even easier for termites and other insects to gain access by climbing up the edges of a foundation slab and between the structural walls and the exterior siding material without being detected until after severe damage has been done to wooden structural members of the building.

Prior methods for preventing termites from entering between the structural walls and the exterior siding material involve saturating the soil adjacent to the perimeter of the structure with pesticides and termiticide at the point of termite entry. This is accomplished by trenching or rodding. In the first of these methods, a trench is dug around the perimeter and filled with termiticide, e.g., at the rate of about four gallons of termiticide per linear foot of trench. In the other method, termiticide is injected through a hollow rod jammed into the soil and against the foundation about every six inches or so. Usually the soil adjacent the foundation is relatively dry. Since dry soil does not absorb liquids easily, it is not uncommon for termiticide applied in this manner to drain away very quickly, thereby making it ineffective at the point of termite entry, and, instead, creating an environmental detriment to the surrounding soil. Further, these methods are quite labor intensive, so they are costly to use. Thus, there has been an ongoing need for an efficient, labor-saving termiticide delivery system for providing an effective perimeter pest control system to create a barrier between the exterior cladding of a building and its foundation and exterior structural walls, whereby the area between them can be sealed from insect intrusion while also providing a means for easily treating the structure on a periodic basis.

While a number of fluid distribution systems for pesticides or termiticides comprised of conduit capable of emitting pesticides or termiticides through apertures or valves have been developed for incorporation in or under a building foundation, these prior systems are typically quite elaborate in construction, requiring extensive modification of traditional and conventional building methods, expensive pumps and reservoirs, and substantial increases in building costs. Such issues have been previously noted, for example, in U.S. Pat. No. 3,513,586 to Meyer et al. which discloses and teaches a distribution system comprising tube means disposed within a building footer constructed of conventional concrete building blocks, requiring additional support members and plate members, among other things, that but for the distribution system, would not be required as part of the footer.

U.S. Pat. No. 3,209,485 to Griffin discloses a pesticide distribution system comprised of multiple, independent, branched circuits, intended to be installed within and under a foundation at the time of construction. The system comprises many parts, and its installation requires multiple steps at different stages of construction of the building.

U.S. Pat. No. 3,602,248 to Peacock discloses a distribution system comprised of a plurality of parallel connected pipe branches, each branch thereof short enough so that fluid pressure is maintained along the entire piping, with at least two inlets into each branch. Each branch requires a closure fitting at the end opposite the inlet end. Multiple pumps are required to maintain uniform pressure in the branch lines.

There are also a number of related systems for distributing pesticide within the walls of buildings. In U.S. Pat. No. 3,676,949 of Ramsey, pipes with emitter nozzles pass through the studs of the walls with a nozzle disposed between each set of studs. In U.S. Pat. No. 3,782,026 of Bridges et al., pipes extend within the walls or, alternatively, beneath baseboard moldings on the interior walls, permitting injection of insecticide gas within the walls. In U.S. Pat. No. 4,028,841 to Lundwall an insecticide storage and pressurizing system is installed in the attic, and perforated pipes carry pest control fluid into the building walls, while U.S. Pat. No. 4,742,641 to Cretti describes a built-in reservoir which is installed within a building wall from which pesticide is distributed whenever the pump is operated (which can be done by a timing device for injecting predetermined amounts at predetermined spaced intervals).

U.S. Pat. No. 3,330,062 to Carter is another pest control system utilizing pipes installed through holes drilled through the wall studs of a building with the pipes requiring threaded caps at their distal ends. U.S. Pat. No. 4,944,110 to Sims relates to a method for applying pesticide into the concealed areas of a building, by injecting pressurized chemicals through perforated preinstalled tubing. U.S. Pat. No. 5,347,749 to Chitwood et al. discloses a system for reapplication of termiticide to the fill dirt underlying the foundation slab of a building at potential termite entry points: junction of foundation block with slab, and openings in the slab for penetration of bundles of utility connections.

While none of the foregoing patents teaches or discloses a system adapted to deliver a termiticide barrier to the exterior walls of a building underneath its surface coating or siding materials, an effort to disclose such a system was made in U.S. Pat. No. 5,819,466 to Aesch, et al., in which a peripheral termiticide delivery system using flexible apertured tubing was described. Nevertheless, that system was designed to simply saturate the exterior foundation walls of a structure, with the treatment going down to the soil, rather than being retrofitted to existing structures having external cement siding, whereby the dual goals of mechanically sealing the exposed area created at the lower portion of the structure while providing a convenient and efficient means for applying pesticide could both be accomplished.

U.S. Pat. No. 6,301,849 which issued Roth describes a flashing article used to seal out and drain away moisture from a stucco coated exterior wall surface, but it does not describe a system which can be used to seal the exposed area between the structural and exterior walls in lapped "plank" type of construction while providing a means for introducing pesticides into such exposed areas.

SUMMARY OF THE INVENTION

In that no combination of the known prior art devices provides a means for accomplishing the results of sealing the exposed area between the foundation and the exterior wall system while providing an efficient, easily installed and easily used means for pesticide treatment the need for such a system is met by the present invention.

In particular, the present invention is an elongated article designed to be installed between the outside of the foundation and the inside of the exterior walls of a structure having a lapped exterior wallboard systems. The invention includes an elongated internal aperture having fill ports formed at spaced intervals along its lower portion, pesticide dispersion holes formed at spaced intervals along its upper portion, means for sealing the article against the foundation wall formed along the side intended to abut the foundation wall, and an attachment channel formed along the opposing side which is designed to facilitate the attachment of the article to the lower edge of the exterior siding. The invention thereby provides an elongated sealing and delivery apparatus through which pesticides or termiticides can be introduced to provide a continuous chemical barrier against ground source pest infestation while simultaneously sealing the exposed area between the foundation and the exterior wall system.

DETAILED DESCRIPTION OF THE PREFERRED EMBODIMENTS

Figure 1:
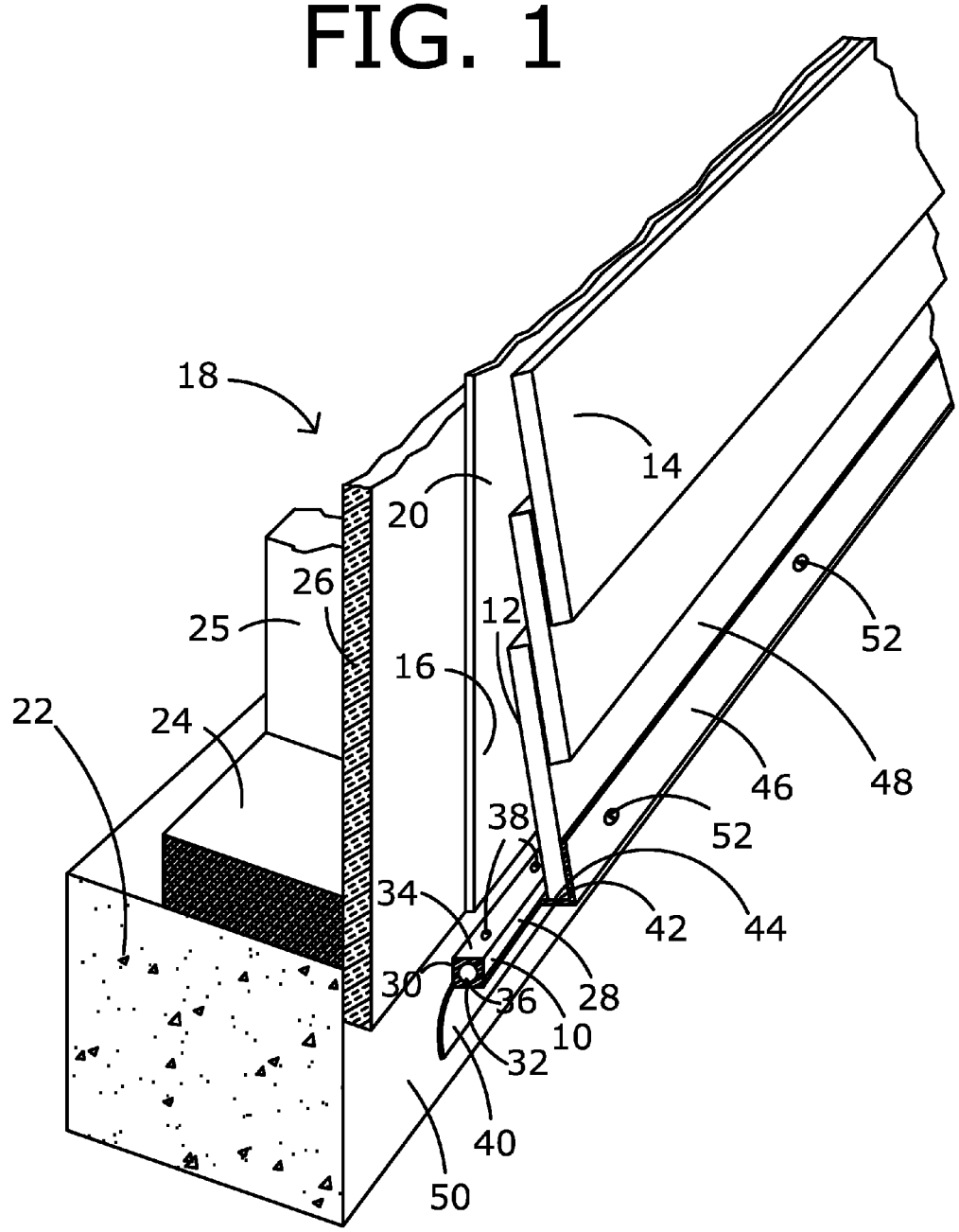
FIG. 1 is a perspective view of an exterior wall system to which the apparatus of the present invention has been attached.

Referring to FIG. 1, the present invention relates to an apparatus 10 designed to be used as both a pesticide or termiticide application appliance and as a seal for the exposed area formed between the inner surface 12 of the exterior wall 14 and the exterior surface 16 of the structural wall system 18, which may, optionally, also include a so-called "house wrap" 20, as illustrated. The structural wall system 18 further comprises a concrete foundation 22, wood "sill" members 24, vertical members, such as stud 25, an exterior "sheathing" which is typically foam, particle board, or plywood 26, with the wrap 20 overlying the sheathing 26.

The apparatus 10 is preferably manufactured using an extrusion process to form the elongated dispersion tube 10 which has a substantially rectangular cross-section. As shown, the central portion of the apparatus 10 preferably comprises an outer wall 28, an inner wall 30, a bottom wall 32, and a top wall 34. An elongated aperture 36 extends through the length of the apparatus 10.

With continued reference to FIG. 1, and with reference to FIGS. 2-5, as appropriate, a series of pesticide dispersion holes 38 are formed in the top wall 34 allowing communication between the outside of the top wall 34, and the interior of the pesticide injection channel 36. While the holes 38 are referred to herein as "pesticide" dispersion holes, those skilled in the art will understand that this term is used solely for convenience, as termiticides are also dispersed therethrough.

The preferred embodiment of the pesticide injection apparatus 10 further comprises an elongated sealing flap 40 which is preferably formed as an extension of the bottom wall 32, which extends outward from the inner wall 30, along with an elongated board attachment channel 42, having a bottom portion 44 and an exterior portion 46, which define the elongated board attachment channel 42 formed therebetween.

With continued reference to FIG. 1, the apparatus 10 is shown affixed to the side of a structure. As shown, the apparatus 10 is placed between the lowest board 48 of the exterior wall, and it is pushed up so that the bottom of that board 48 slides into the board attachment channel 42. When the apparatus 10 is slid upward into position, the sealing flap 40 flexes down to seal the apparatus 10 against the foundation wall 50. Then, screws 52, are used to attach the apparatus 10 to the board 48, thereby holding it in place.

Figure 2:
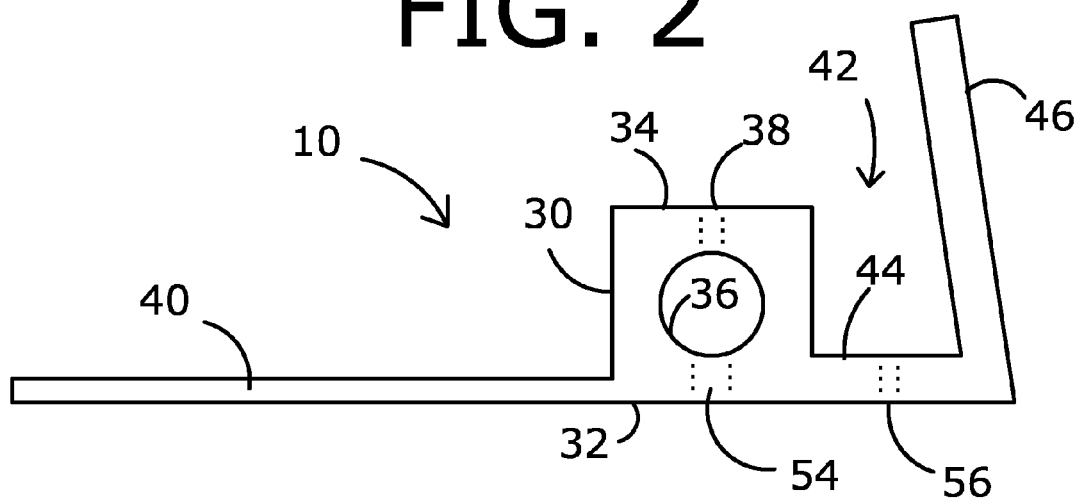
FIG. 2 is a side view of the invention of FIG. 1 further illustrating the manner in which the article looks when it is formed.
Figure 3:
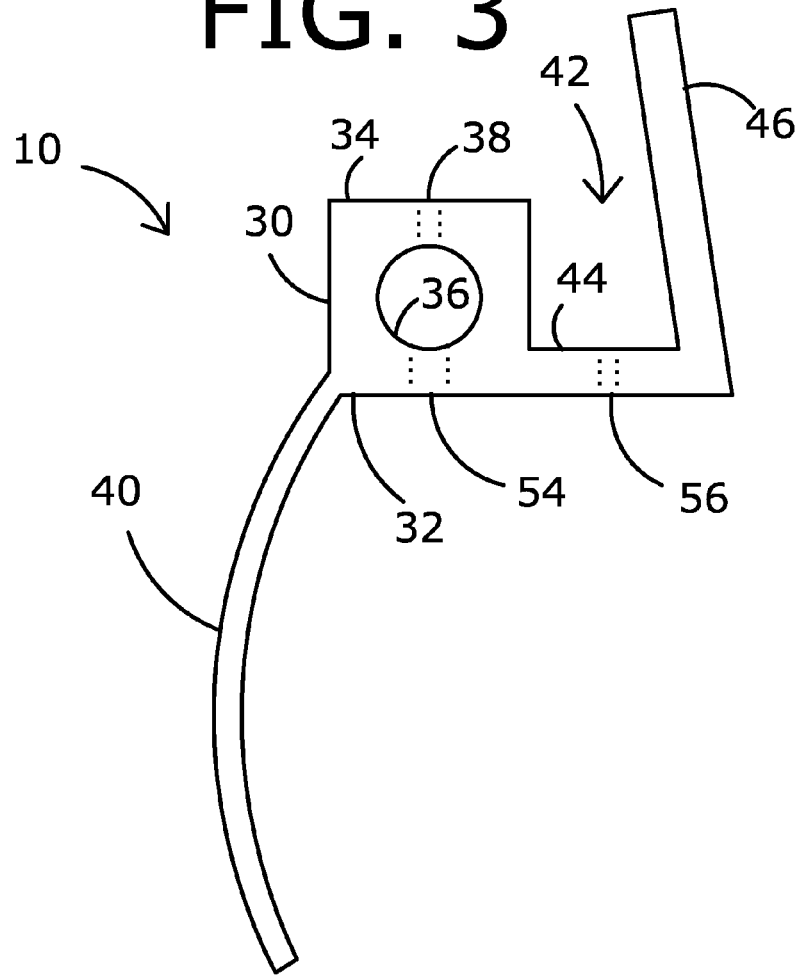
FIG. 3 is a side view of the invention of FIG. 1 further illustrating the manner in which the article looks when the resilient foundation sealing flap is deflected.
Figure 4:
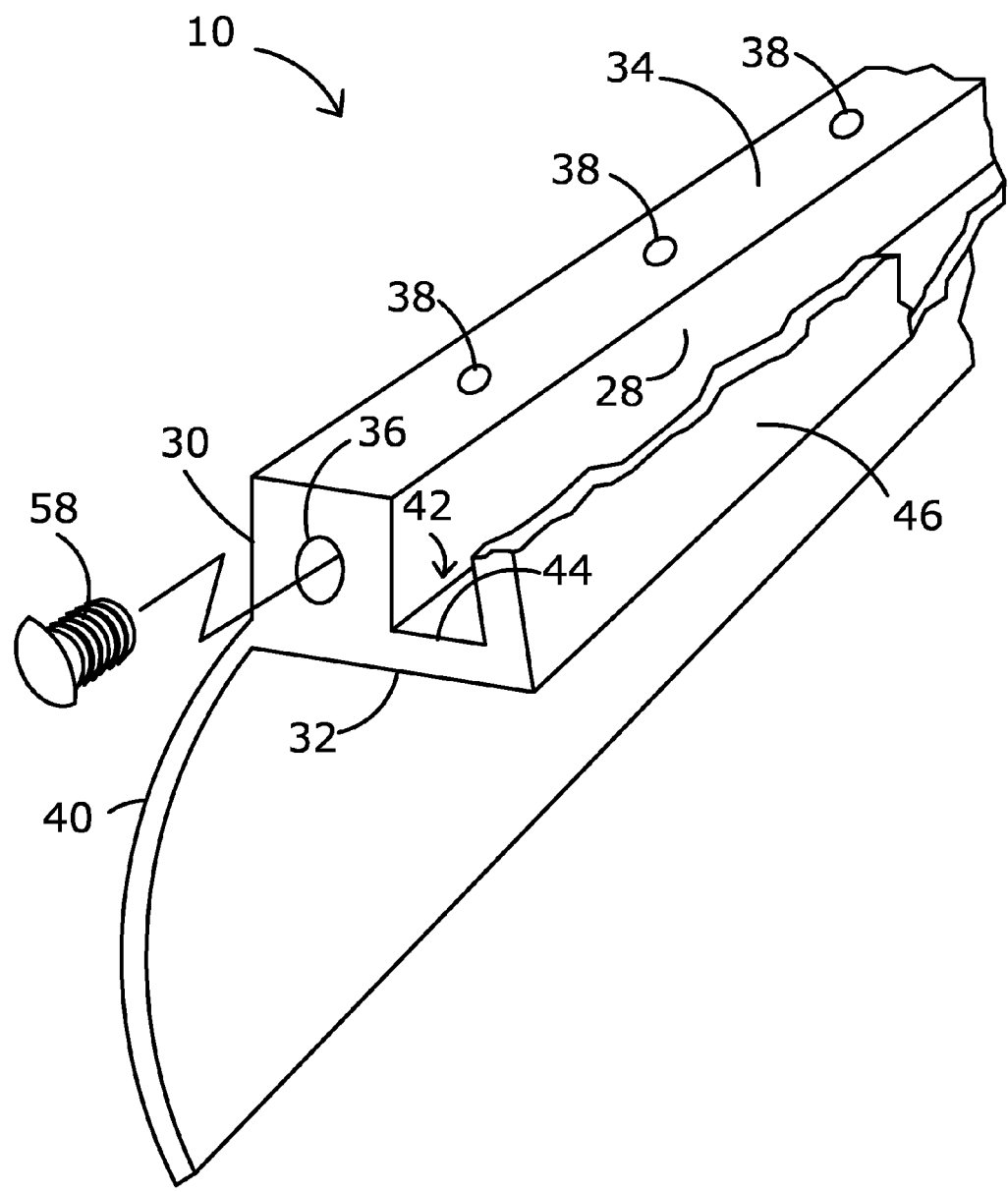
FIG. 4 is a top perspective view of the invention of FIG. 1 further illustrating an end cap used to seal the end of the pesticide dispersion tube, the spaced pesticide dispersion holes on the top of the pesticide dispersion tube.
Figure 5:
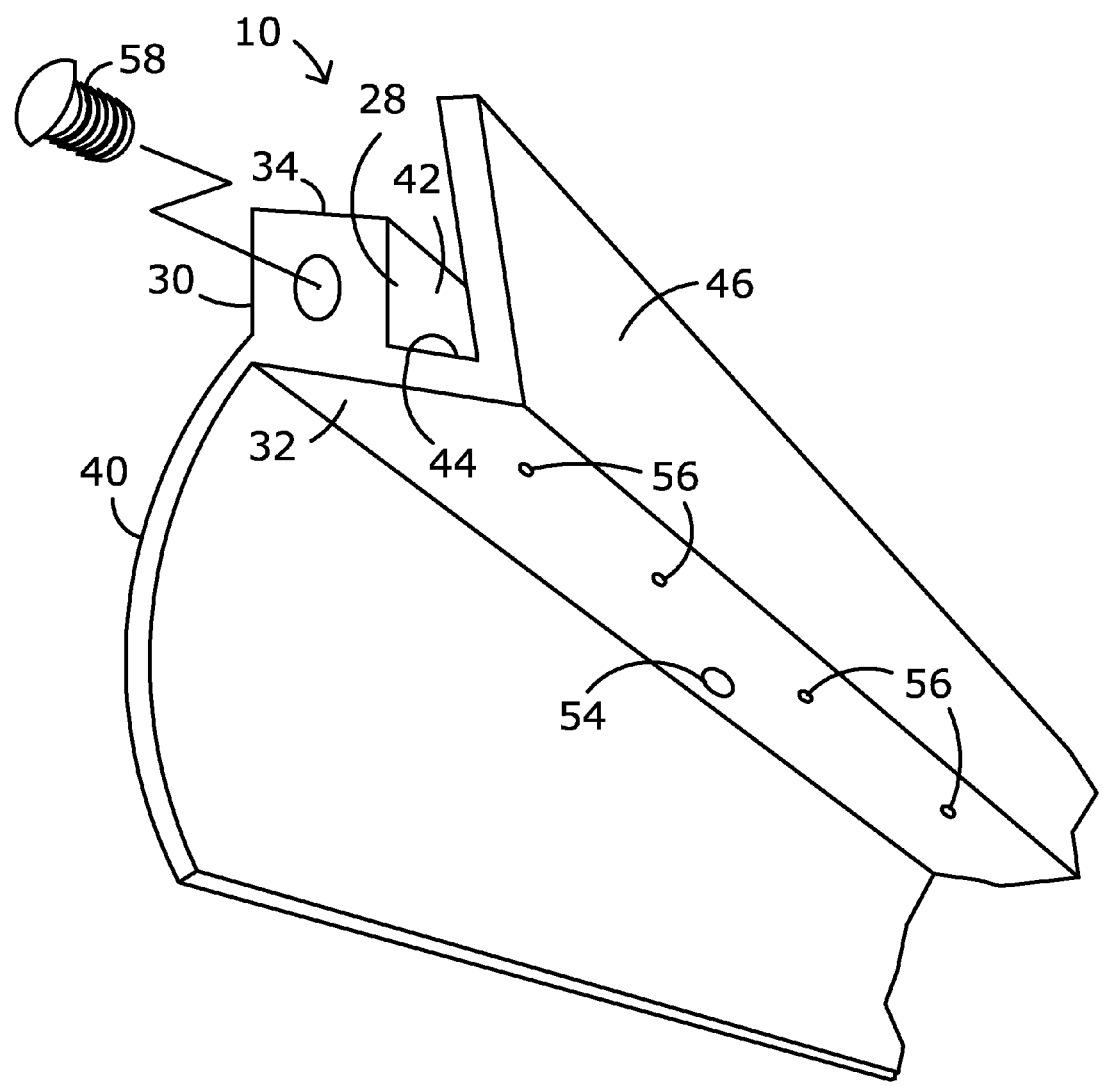
FIG. 5 is a bottom perspective view of the invention of FIG. 1 further illustrating the end cap used to seal the end of the pesticide dispersion tube and also illustrating a pesticide fill port and the water drain holes on the bottom of the pesticide dispersion tube.

With reference to FIG. 2, the manner in which the sealing flap 40 is formed, is shown, while in FIG. 3, its resilience, which allows it to flex downward to seal against the foundation wall 50 (See, FIG. 1), is shown. FIGS. 2 and 3 also illustrate (in shadow) how the dispersion holes 38 down through the upper wall 34 of the apparatus 10 into the aperture 36, while the pesticide fill ports 54 extend upward through the lower wall 32 into the aperture 36. Similarly, water drainage holes 56 (See, FIGS. 2, 3, and 5) extend upward through the lower wall 32 into the board attachment channel 42, so as to allow drainage of any water which might have collected in the board attachment channel 42.

The general overall manner in which the present invention 10 is used and installed has been described. In order to manufacture the invention, one would preferably use a flexible material which can be formed using an extrusion process. While the particular material is subject to variation depending upon environmental, and other, factors, materials which have been found to be suitable include various types of plastic composites, LPDE, and industrial vinyl.

In the preferred embodiment, the invention is formed by extrusion in 100 foot lengths, although longer or shorter lengths could be formed. The main section of the pesticide dispersion tube 10 has a square cross-section having ½ inch edges, with a ¼ inch diameter aperture 36 formed therethrough. The foundation seal 40 is formed to be one-sixteenth inch thick and to extend out one and one-half inches from the main section of the dispersion tube 10, while the board attachment channel is formed with a ⅜ inch wide opening 42 and with a one inch high exterior wall 46, which is formed to slope inward, as shown, at an angle of approximately 15 degrees.

In the preferred embodiment of the invention, the pesticide dispersion holes 38 have a diameter of about 0.0312 inches, and they are spaced about 6 inches apart, while the pesticide fill ports 54 preferably have a diameter of about 0.11 inches, and they are spaced about 5 feet apart, with the first one being about 2½ feet from the end of the dispersion tube 10. Finally, the water drainage holes 56 are spaced about one foot apart, and their diameter is generally not critical.

In order to use the apparatus 10 following its installation, one injects a foamed pesticide through the pesticide fill ports 54. In order to avoid having the foam simply come out of the ends of the aperture 36, the ends are plugged. In the preferred embodiment of the invention preformed plastic plugs 58 which have ridges (See, FIGS. 4-5) are used to plug the ends of the aperture 36.

The present invention can be installed on structures having either slab or basement foundations, and it is intended to allow a pest control service company to periodically apply a uniform pesticide or termiticide barrier around the exterior of a home or other structure in an area which protects the pesticide or termiticide against degradation from exposure to the elements. It also minimizes the amount of pesticide that would come in contact with the exterior of the building. As will be understood by those skilled in the art, the invention can be used with any type of lapped siding, including wood, composite board siding, cement board siding, aluminum siding, or vinyl siding.

The present invention can be used as a stand-alone pest control treatment, or it can be used in conjunction with other traditional pest or termite treatment products and protocols. Its design allows for the application of pesticide or termiticide without requiring entry into the home, so it is not necessary to schedule treatments only when someone can be present to provide access.

Although the system creates a mechanical barrier against pest infestation, the primary effectiveness of the invention is determined by the efficacy of the pesticide used in the system. In that regard, various pesticides and termiticides can be used. One which has been used in a foam supplied through the use of a portable foam generator of the type produced by NoHowe Product Development Ltd. of Midhurst Ontario and described in U.S. Pat. No. 6,755,400 to Howe, using their ProFoam Platinum product, has been Termidor, although other types of pesticide or termiticides, such as those made by Dupont or FMC, could also be used in any suitable foam carrier.

While there are industry distinctions between "pesticides" and "termiticides" those skilled in the art will recognize that the present invention, described herein, can be used with any pesticide or termiticide which can be injected through it in a foam carrier as described above. As the efficacy of the treatment will be determined by the specific pesticide or termiticide which is used, the present invention should be regarded as an appliance which makes such treatment possible. Accordingly, nothing in the descriptions set forth above should be regarded as limiting the use of the present invention to either a pesticide or a termiticide, or to any particular pesticide or termiticide.

While the invention has been described in connection with specific embodiments and applications, the inventors do not intend to restrict the description to the examples shown. Persons skilled in the art will recognize that the above methods may be modified or changed without departing from the general scope of this description. The inventors also intend to include all such modifications and alterations in so far as they come within the scope of the appended claims or the equivalents thereof.

I claim:

1. A pest control system for a vertical wall system in a structure having a wall system of the type comprising:

an interior wall structure overlying a sill plate which is directly affixed to an upper surface of a foundation wall, said foundation wall having an outer vertical surface whose above-ground portion is generally exposed, said interior wall structure including a plurality of spaced vertical members, said interior wall structure also comprising an exterior wall covering, said exterior wall covering having an interior surface affixed to said spaced vertical members and an exterior wall surface; and an external wall covering comprised of lapped boards attached to said exterior wall surface of said interior wall structure, said external wall covering having an internal surface which is spaced from said exterior wall surface of said interior wall structure by a space sufficient for insects or termites to fit therebetween, said external wall covering having a bottom edge which extends below said sill plate which supports said interior wall structure, whereby said bottom edge overlies the outer vertical surface of said foundation wall, comprising:

(a) an elongated tubular member, said elongated tubular member having an elongated aperture which extends substantially through its entire length, said elongated tubular member having a size and configuration adapted to permit it to fit between said exterior wall surface of said interior wall structure and said internal surface of said external wall covering, said elongated tubular member being disposed between said bottom edge of said external wall covering and said exterior wall surface of said interior wall structure, whereby said elongated tubular member is affixed to said outer vertical surface of said foundation wall and does not overlie said foundation wall;

(b) means for sealing said elongated tubular member against said outer vertical surface of said foundation wall;

(c) means for attaching said elongated tubular member between said outer vertical surface of said foundation wall without overlying said foundation wall;

(d) means for permitting the injection of a foam containing a pesticide or termiticide into said elongated aperture; and (e) means for distributing said foam along at least a portion of the length of said elongated aperture and out of said elongated tubular member into the space defined between said outer vertical surface of said foundation wall and said internal surface of said external wall covering.

2. The pest control system of claim 1 wherein said elongated tubular member has a substantially rectangular central cross-section.

3. The pest control system of claim 2 wherein said elongated aperture has a substantially circular cross-section.

4. The pest control system of claim 2 wherein said elongated tubular member has a substantially square central cross-section.

5. The pest control system of claim 4 wherein said substantially square cross-section has an edge dimension of about one-half inch.

6. The pest control system of claim 5 wherein said elongated aperture has a substantially circular cross-section which has a diameter of about one-quarter inch.

7. The pest control system of claim 2 wherein said means for attaching said elongated tubular member between said foundation wall and said internal surface of said external wall covering comprises a channel which extends outward from said substantially rectangular central cross-section of said elongated tubular member.

8. The pest control system of claim 7 wherein said channel is formed to have a substantially L-shaped cross-section, whereby a U-shaped board attachment channel is formed therein.

9. The pest control system of claim 8 wherein the width of said U-shaped board attachment channel is approximately ⅜ inch.

10. The pest control system of claim 9 wherein the height of that portion of said channel attachment means which is remote from said central tubular section is approximately one inch.

11. The pest control system of claim 1 wherein said means for permitting the injection of said foam into said elongated aperture comprises a series of pesticide fill ports which extend from said elongated aperture down through the bottom of said elongated tubular member.

12. The pest control system of claim 11 wherein said pesticide fill ports have a diameter of about 0.11 inches.

13. The pesticide control system of claim 12 wherein said pesticide fill ports are spaced about five feet apart.

14. The pest control system of claim 1 wherein said means for distributing said foam comprises a series of pesticide dispersion holes which extend from said elongated aperture up through the top of said elongated tubular member.

15. The pest control system of claim 14 wherein said pesticide dispersion holes have a diameter of about 0.0312 inches.

16. The pesticide control system of claim 15 wherein said pesticide dispersion holes are spaced about six inches apart.

17. The pesticide control system of claim 1, wherein said system is formed in an extrusion process from a material selected from the group consisting of plastic composites, LPDE, and industrial vinyl.

\* \* \* \* \*